(12) United States Patent
Kozar et al.

(10) Patent No.: US 7,763,814 B2
(45) Date of Patent: Jul. 27, 2010

(54) ELECTRICAL SWITCHING APPARATUS AND TOOL THEREFOR

(75) Inventors: Aaron T. Kozar, Zelienople, PA (US); Lance Gula, Clinton, PA (US)

(73) Assignee: Eaton Corporation, Cleveland, OH (US)

( * ) Notice: Subject to any disclaimer, the term of this patent is extended or adjusted under 35 U.S.C. 154(b) by 255 days.

(21) Appl. No.: 11/968,738

(22) Filed: Jan. 3, 2008

(65) Prior Publication Data

US 2009/0173604 A1    Jul. 9, 2009

(51) Int. Cl.
*H01H 9/20* (2006.01)
(52) U.S. Cl. ................... 200/50.24; 200/400
(58) Field of Classification Search ... 200/50.21–50.26, 200/331, 337, 400; 74/543–550; 81/177.6
See application file for complete search history.

(56) References Cited

U.S. PATENT DOCUMENTS

| | | | |
|---|---|---|---|
| 1,715,902 A * | 6/1929 | Countryman | ................ 74/547 |
| 3,958,156 A | 5/1976 | Tjebben | |
| 4,334,445 A * | 6/1982 | Timewell | ................... 81/177.7 |
| 4,465,911 A * | 8/1984 | Ootsuka | ..................... 200/331 |
| 4,761,521 A | 8/1988 | Beck et al. | |
| 5,278,722 A * | 1/1994 | Peruso | ....................... 361/606 |
| 5,421,180 A * | 6/1995 | Rojdev | ..................... 70/456 R |
| 5,477,017 A * | 12/1995 | Swindler et al. | ......... 200/50.24 |
| 6,234,049 B1 * | 5/2001 | Ju et al. | ..................... 81/57.39 |
| 6,875,935 B2 * | 4/2005 | Abrahamsen et al. | .... 200/50.24 |
| 7,019,230 B1 | 3/2006 | Vaill et al. | |
| 7,066,059 B1 * | 6/2006 | Hsieh | ......................... 81/177.7 |
| 2003/0119382 A1 | 6/2003 | Narusevicius et al. | |

* cited by examiner

*Primary Examiner*—Renee Luebke
*Assistant Examiner*—Lisa Klaus
(74) *Attorney, Agent, or Firm*—Martin J. Moran (57) ABSTRACT

A tool is provided to manipulate an electrical switching apparatus, such as a circuit breaker, with respect to a housing structure. The circuit breaker has a mechanical interface. The tool includes an actuating mechanism having a plurality of segments and joints, which movably connect the segments. One segment is engageable with the mechanical interface of the circuit breaker. Another segment comprises a handle portion structured to be gripped by a user. The actuating mechanism is movable between a first position in which the segments are substantially parallel with respect to one another, and a second position in which adjacent segments are substantially perpendicular to each other. When disposed in the first position, the tool is stowable in an opening of the circuit breaker. When disposed in the second position, the tool is operable to move the circuit breaker in a predetermined manner with respect to the housing structure.

8 Claims, 5 Drawing Sheets

ELECTRICAL SWITCHING APPARATUS AND TOOL THEREFOR

BACKGROUND OF THE INVENTION

1. Field of the Invention

The invention relates generally to electrical switching apparatus and, more particularly, to electrical switching apparatus such as, for example, circuit breakers. The invention also relates to tools for manipulating electrical switching apparatus.

2. Background Information

Electrical switching apparatus used in power distribution systems are often mounted within a housing structure (e.g., without limitation, switchgear enclosure) either individually or in combination with other switchgear (e.g., without limitation, circuit switching devices and circuit interrupters such as circuit breakers, contactors, motor starters, motor controllers and other load controllers).

Some electrical switching apparatus such as, for example, some medium voltage and low voltage circuit breakers, can be relatively large. In order to facilitate movement (e.g., installation; removal; replacement; maintenance), a sizeable circuit breaker is commonly coupled to rollers, which permit such circuit breaker to be drawn out of the housing assembly. Accordingly, such circuit breakers are commonly known in the art as "draw-out" circuit breakers. The process of moving the circuit breaker into the housing is commonly referred to as "racking" the circuit breaker.

The enclosure, which houses the draw-out circuit breaker, generally includes side walls, a top, a bottom, a door and a draw-out mechanism. The draw-out mechanism includes, for example, a combination of rails and rollers on one or both of the side walls of the enclosure and the sides of the circuit breaker. The circuit breaker may be further supported within a draw-out frame, commonly known in the art as a cassette or chassis. Draw-out circuit breakers are described in further detail, for example, in commonly assigned U.S. Pat. No. 7,019,229, which is hereby incorporated herein by reference.

To facilitate movement (e.g., drawing out; racking) of the circuit breaker with respect to the housing structure, some draw-out circuit breakers further include a suitable mechanism such as, for example and without limitation, a number of racking screws and/or a linkage assembly that interconnects the circuit breaker and the housing structure. Typically, the mechanism further includes an interface disposed on the circuit breaker. The interface is actuatable mechanically, for example, by a mechanical tool (e.g., without limitation, hand crank), or electronically, for example, by a motor-driven device, to draw out or rack in the circuit breaker, as desired.

U.S. Pat. No. 5,278,722, for example, discloses a switchgear racking mechanism including a self-retaining crank and draw-out unit position indicator.

U.S. Pat. No. 5,477,017, for example, discloses an electric racking device for racking circuit breakers into switchgear.

U.S. Pat. No. 7,019,230, which is hereby incorporated herein by reference, discloses a racking device and power module therefor.

Among the disadvantages of the foregoing mechanisms are that they are either relatively complex and bulky, for example, in the case of known electric racking devices, or in the case of mechanical devices (e.g., tools), the tools are not designed so as to optimize their utility (e.g., without limitation, mechanical leverage). Misplacement or loss of the tool is also a concern, because it is generally a separate component from the circuit breaker.

There is, therefore, room for improvement in electrical switching apparatus such as, for example, draw-out circuit breakers.

There is also room for improvement in tools for facilitating movement of electrical switching apparatus.

SUMMARY OF THE INVENTION

These needs and others are met by embodiments of the invention, which are directed to a collapsible tool for racking electrical switching apparatus such as, for example, a draw-out circuit breaker, into and out of an electrical enclosure. In the collapsed position, the tool may be stowed in a cavity of the circuit breaker.

As one aspect of the invention, a tool is provided, which is structured to manipulate an electrical switching apparatus with respect to a housing structure. The electrical switching apparatus includes a mechanical interface. The tool comprises: an actuating mechanism including a plurality of segments, one of the segments being structured to be coupled to the mechanical interface of the electrical switching apparatus, another one of the segments comprising a handle portion structured to be gripped by a user; and a plurality of joints movably connecting the plurality of segments. The actuating mechanism is movable between a first position in which the segments are disposed substantially parallel with respect to one another, and a second position in which adjacent segments of the plurality of segments are disposed substantially perpendicular with respect to each other.

The plurality of segments of the actuating mechanism may be a first segment, a second segment, and a third segment, wherein the second segment is disposed between the first segment and the third segment. The plurality of joints may be a first joint and a second joint, wherein the first joint movably couples the first segment to the second segment, and wherein the second joint movably couples the second segment to the third segment. The second segment may comprise a first side and a second side disposed opposite the first side, wherein the first segment is pivotable about the first joint toward and away from the first side of the second segment, and wherein the third segment is pivotable about the second joint toward and away from the second side of the second segment.

The actuating mechanism may have a width, the first segment may have a first width, the second segment may have a second width, and the third segment may have a third width. When the actuating mechanism is disposed in the first position, the width of the actuating mechanism may be substantially equal to the first width of the first segment plus the second width of the second segment plus the third width of the third segment. Alternatively, the third segment may comprise an elongated cavity wherein, when the actuating mechanism is disposed in the first position, the first segment and the second segment are substantially disposed within the elongated cavity and the width of the actuating mechanism is substantially equal to the third width of the third segment.

Each of the first segment, the second segment, and the third segment may have a first end and a second end disposed opposite and distal from the first end. The first end of the first segment may be structured to engage the mechanical interface of the electrical switching apparatus. The first joint may comprise at least one first fastener pivotably coupling the second end of the first segment to the first end of the second segment, and the second joint may comprise at least one second fastener pivotably coupling the second end of the second segment to the first end of the third segment.

As another aspect of the invention, an electrical switching apparatus is provided, which is structured to be movable with respect to a housing structure. The electrical switching apparatus comprises: an enclosure having an exterior; a mechanical interface accessible from the exterior of the enclosure; and a tool comprising: an actuating mechanism including a plurality of segments, one of the segments being engageable with the mechanical interface of the electrical switching apparatus, another one of the segments comprising a handle portion structured to be gripped by a user, and a plurality of joints movably connecting the segments of the actuating mechanism. The actuating mechanism is movable between a first position in which the segments are disposed substantially parallel with respect to one another, and a second position in which adjacent segments of the plurality of segments of the actuating mechanism are disposed substantially perpendicular with respect to each other. When the actuating mechanism of the tool is disposed in the second position and the one of the segments of the actuating mechanism is engaging the mechanical interface, the tool is structured to be operable to move the electrical switching apparatus in a predetermined manner with respect to the housing structure.

The enclosure may include at least one opening which may be accessible from the exterior of the enclosure. The tool may be stowable within such opening when the actuating mechanism of the tool is disposed in the first position.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, the invention will be described as applied to medium voltage circuit breakers, although it will become apparent that it could also be applied to other types of electrical switching apparatus (e.g., without limitation, low voltage electrical switching apparatus; circuit switching devices and other circuit interrupters such as contactors, motor starters, motor controllers and other load controllers) housed within a housing structure, such as a metallic switchgear cabinet or metal clad power circuit breaker rack structure.

Directional phrases used herein, such as, for example, left, right, inward, outward, clockwise, counterclockwise and derivatives thereof, relate to the orientation of the elements shown in the drawings and are not limiting upon the claims unless expressly recited therein.

As employed herein, the term "racking" refers to any suitable manipulation of an electrical switching apparatus, such as a circuit breaker, with respect to a housing structure (e.g., without limitation, a switchgear cabinet or other suitable electrical enclosure) and expressly includes, without limitation, insertion or removal of the circuit breaker from the housing structure.

As employed herein, the term "linkage assembly" refers to any known or suitable mechanism (e.g., without limitation, a cable; an assembly of gears; a wire; a chain; a number of interconnected links) for interconnecting one component to another in order to provide mechanical communication and movement therebetween.

As employed herein, the terms "fastener" and "fastener mechanism" refer to a separate element or elements which is/are employed to pivotably connect two or more components together, and expressly include, without limitation, rivets, bushings, pins, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" refers to the quantity one or an integer greater than one (i.e., a plurality).

Figure 1:
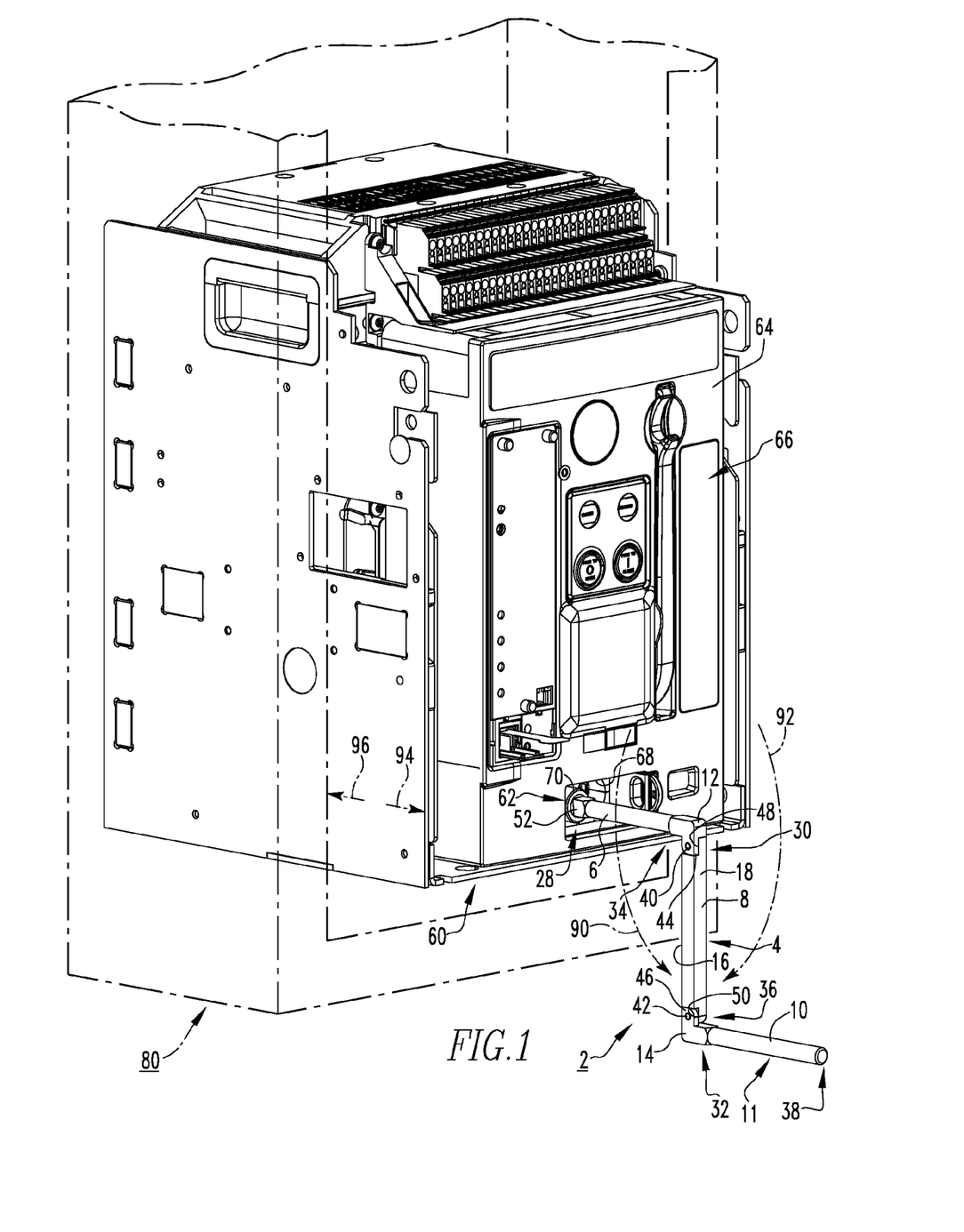
FIG. 1 is an isometric view of a draw-out circuit breaker and a tool therefor, in accordance with an embodiment of the invention, showing the circuit breaker being drawn out from a housing structure which is partially shown in phantom line drawing.

FIG. 1 shows a tool 2 structured to manipulate (e.g., without limitation, move outward in the direction of arrow 94; move inward in the direction of arrow 96) an electrical switching apparatus, such as, for example, a circuit breaker 60, with respect to a housing structure, such a switch gear cabinet 80 that is partially shown in phantom line drawing. The circuit breaker 60 includes a mechanical interface 62 and an enclosure 64. The mechanical interface 62 is accessible from the exterior 66 of the enclosure 64.

The tool 2 includes an actuating mechanism 4 having a plurality of segments 6,8,10. The segment 6 is engageable with the mechanical interface 62, and the segment 10 forms a handle portion 11 structured to be gripped by a user (not shown). A plurality of joints 12,14 movably connect the segments 6,8,10 such that the actuating mechanism 4 is movable between a first position (see, for example, the folded position of FIGS. 2 and 4B; see also the folded position of actuating mechanism 104 of FIG. 5B) in which the segments 6,8,10 are disposed substantially parallel with respect to one another, and a second position (e.g., unfolded or extended position), shown in FIG. 1 (see also FIGS. 3 and 4A, and the extended position of actuating mechanism 104 of FIG. 5A), in which adjacent segments 6,8 and 8,10 of the actuating mechanism 4 are substantially perpendicular with respect to each other. When the actuating mechanism 4 of the tool 2 is disposed in the second position (FIGS. 1, 3 and 4A) and segment 6 of the actuating mechanism 4 is engaging the mechanical interface 62 of the circuit breaker 60, the tool 2 is operable to move the circuit breaker 60 in a predetermined manner with respect to the housing structure 80. For instance, in the example of FIG. 1, the tool actuating mechanism 4 is pivotable counterclockwise (from the perspective of FIG. 1) in the direction of arrow 90, or clockwise (from the perspective of FIG. 1) in the direction of arrow 92 to move the circuit breaker 60 outward (from the perspective of FIG. 1) in the direction of arrow 94 or inward (from the perspective of FIG. 1) in the direction of arrow 96, respectively.

Figure 2:
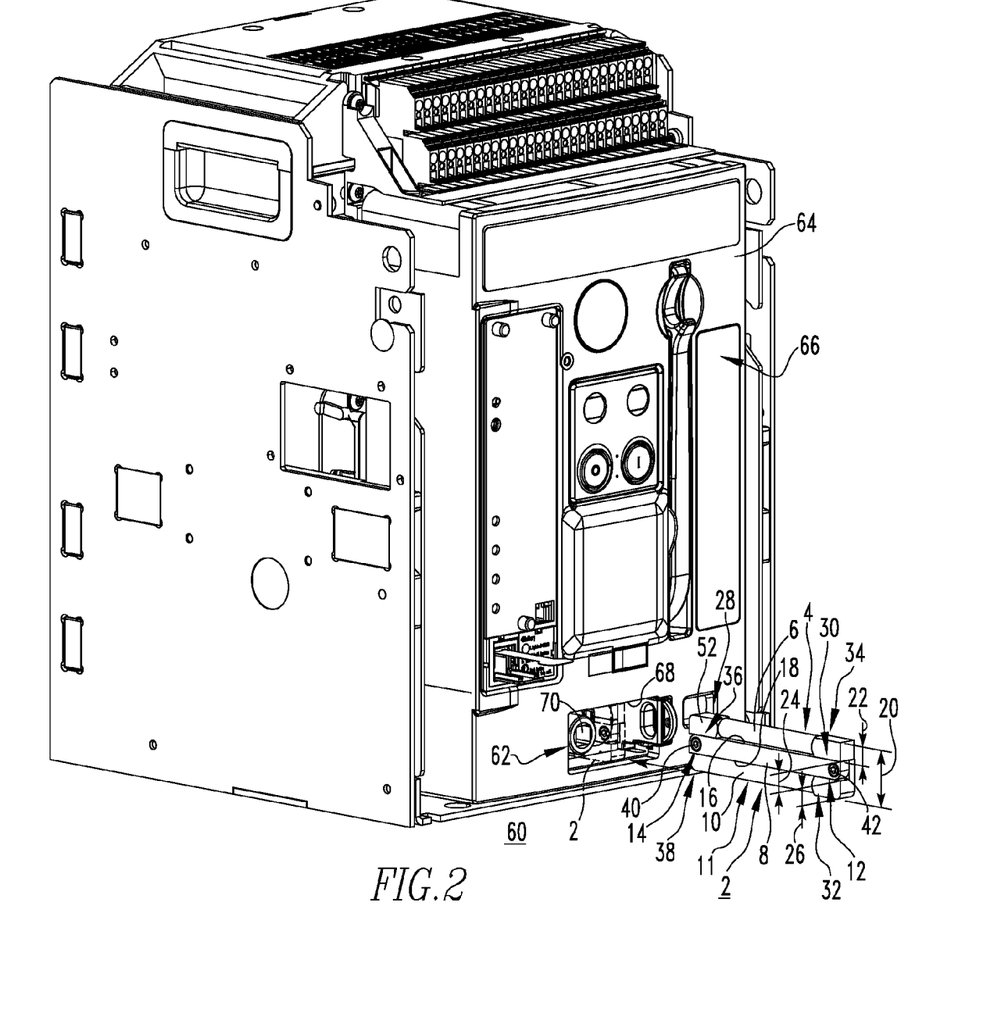
FIG. 2 is a partially exploded isometric view of the draw-out circuit breaker and tool therefor of FIG. 1, modified to show the tool in a first, folded position, and also showing the tool in phantom line drawing stowed within the circuit breaker.
Figure 3:
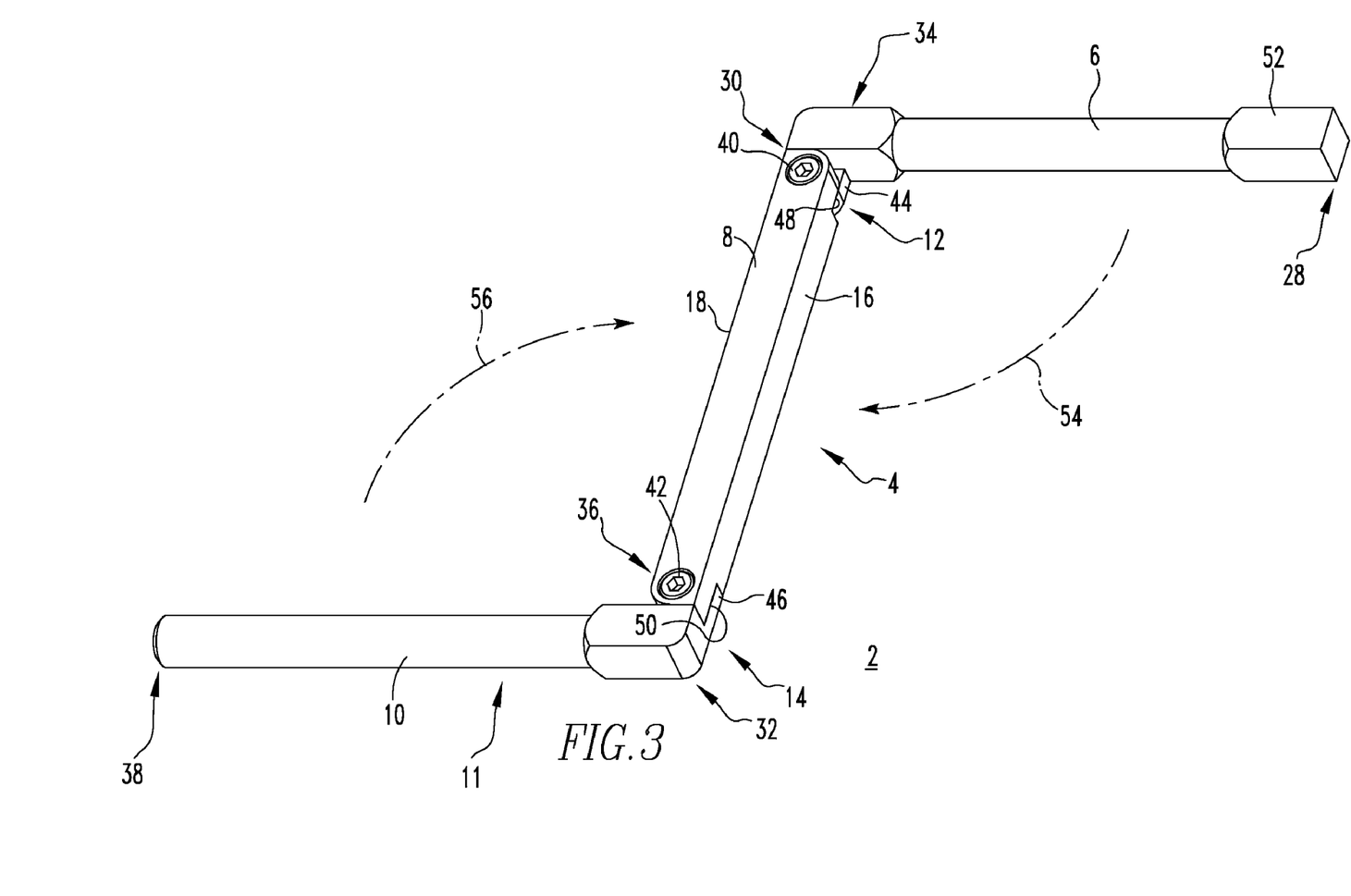
FIG. 3 is an isometric view of the tool of FIG. 2, modified to show the tool in an extended position.
Figure 4A:
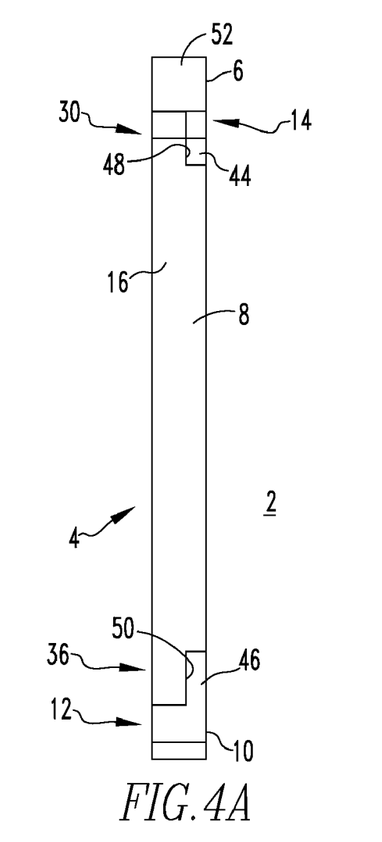
FIG. 4A is a vertical end elevation view of the tool of FIG. 3.
Figure 4B:
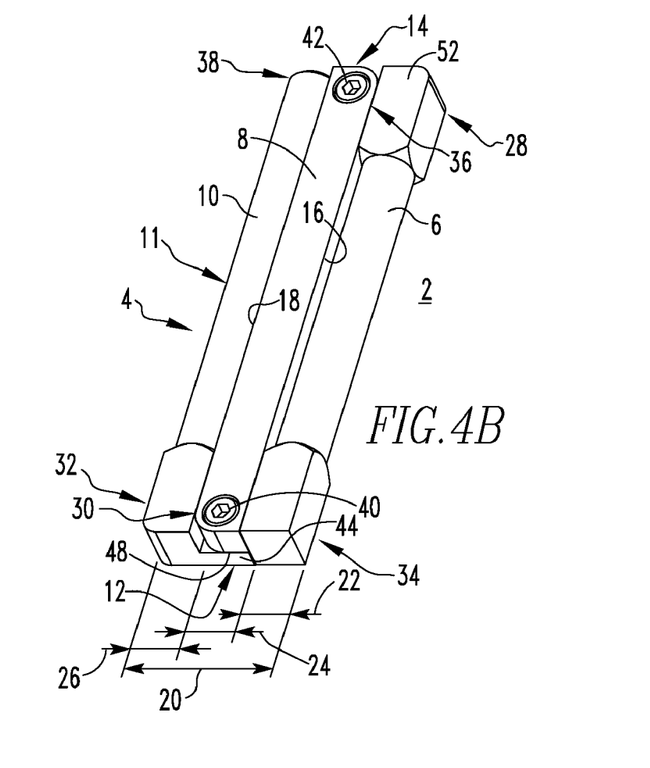
FIG. 4B is an isometric view of the tool of FIG. 2.

The example actuating mechanism 4 includes first, second and third segments 6, 8 and 10 (all shown in FIGS. 1-3 and 4B) and first and second joints 12 and 14 (both shown in FIGS. 1-3, 4A and 4B). The second segment 8 is disposed between the first segment 6 and the third segment 10. However, it will be appreciated that the actuating mechanism 4 could have any known or suitable alternative plurality (e.g., more than two) and/or configuration of segments and joints therebetween, without departing from the scope of the invention. The second segment 8 of the tool actuating mechanism 4 shown in FIGS. 1-3 and 4B has first and second opposing sides 16,18, wherein the first segment 6 is pivotable about the first joint 12 toward (see arrow 54 of FIG. 3) and away from the first side 16, and the third segment 10 is pivotable about the second joint 14 toward (see arrow 56 of FIG. 3) and away from the second side 18. As shown in FIGS. 2 and 4B, the actuating mechanism 4 has a width 20, and the first, second and third segments 6, 8 and 10 have first, second and third widths 22,24 and 26, respectively. When the actuating mechanism 4 is disposed in the first position, shown in FIGS. 2 and 4B, the width 20 of the actuating mechanism 4 is substantially equal to the sum of the first, second and third widths 22, 24 and 26 of the first, second and third segments 6, 8 and 10, respectively.

Continuing to refer to FIG. 2, it will be appreciated that the enclosure 64 of the example circuit breaker 60 further includes at least one opening 68, which is accessible from the exterior 66 of the circuit breaker enclosure 64. As partially shown in phantom line drawing in FIG. 2, the tool 2 is stowable within the opening 68 when the actuating mechanism 4 of the tool 2 is disposed in the first position, and is not in use. Although the opening 68 of the example circuit breaker 60 is disposed at or about the mechanical interface 62 (e.g., without limitation, to the right of interface 62 from the perspective of FIGS. 1 and 2) of the circuit breaker 60, it will be appreciated that it could alternatively be disposed at any other suitable accessible location on the circuit breaker enclosure 64. It will also be appreciated that the opening 68 could have a separate covering (e.g., without limitation, a closable door) (not shown) structured to suitably cover the opening 68 and/or tool 2 stowed therein. This stowable aspect of the disclosed tool 2 is highly advantageous as it minimizes the likelihood that the tool 2, which can be a separate component from the circuit breaker 60, will be misplaced or lost. Specifically, the disclosed tool 2 is collapsible to the relatively compact configuration, shown in FIG. 2 (see also tool 102 shown in the collapsed position in FIG. 5B), in which it can be quickly and easily stored (e.g., stowed) within the circuit breaker opening 68 until its use is required.

Referring to FIGS. 1 and 2, it will be appreciated that the mechanical interface 62 of the example circuit breaker 60 is a socket 70. The socket 70 is pivotable in a first direction (e.g., counterclockwise from the perspective of FIG. 1, in the direction of arrow 90) corresponding to the circuit breaker 60 being drawn out of the housing structure 80 (partially shown in phantom line drawing in FIG. 1) in the direction indicated by arrow 94 (FIG. 1), and in a second direction (e.g., clockwise from the perspective of FIG. 1, in the direction of arrow 92) corresponding to the circuit breaker 60 being racked into the housing structure 80 in the direction indicated by arrow 96 (FIG. 1). To facilitate this process, the first segment 6 of the example tool actuating mechanism 4 is a socket insert 52. The socket 70 receives the socket insert 52, in order that the tool 2 can be moved to pivot the socket 70 in the first direction (e.g., counterclockwise) or the second direction (e.g., clockwise). In this regard, it will be appreciated that the configuration of the example actuating mechanism 4, when it is disposed in the second position (e.g., extended position), shown in FIG. 1, is designed to optimize the mechanical leverage of the tool 2 to facilitate the aforementioned draw-out and/or rack in operations. Specifically, by including two joints 12,14 wherein the first and third segments 6 and 10 of the actuating mechanism 4 are substantially perpendicular with respect to the intermediate second segment 8, the handle portion 11 of the tool 2 is disposed at a position, which maximizes the mechanical leverage forces (e.g., without limitation, bending moment; torque) capable of being applied by the user (not shown) to the mechanical interface 62 to move the circuit breaker 60 in the desired direction (e.g., outward in the direction of arrow 94; inward in the direction of arrow 96), using a minimal amount of applied force.

As best shown in FIG. 3, each of the first, second and third segments 6, 8 and 10, respectively includes a first end 28, 30 and 32 and a second end 34, 36 and 38 disposed opposite and distal from the first end 28,30 and 32. The first end 28 of the first segment 6 includes the aforementioned socket insert 52. The first joint 12 includes at least one fastener 40 (one is shown) pivotably coupling the second end 34 of the first segment 6 to the first end 30 of the second segment 8. The second joint 14 includes at least one second fastener 42 (one is shown) pivotably coupling the second end 36 of the second segment 8 to the first end 32 of the third segment 10. It will, however, be appreciated that any other known or suitable number, type and/or configuration of fastener(s) (not shown) can be employed to form the first and second joints (e.g., 12,14). For example, as shown in FIGS. 5A and 5B, discussed hereinbelow, the first joint 112 includes one fastener (e.g., without limitation, first and second pins 140), and the second joint 114 includes one fastener (e.g., without limitation, pin 142) and a perpendicular pivot element 143 (e.g., without limitation, a pin assembly).

Continuing to refer to FIG. 3, and also to FIG. 4A, the first segment 6 of the actuating mechanism 4 includes a tab 44 extending outwardly from the second end 34 thereof. Similarly, the third segment 10 includes a tab 46 extending outwardly from the first end 32 thereof. The first end 30 of second segment 8 includes a first recess 48, which pivotably receives the tab 44 of the first segment 6, and the second end 36 of the second segment 8 includes a second recess 50, which pivotably receives the tab 46 of the third segment 10, as shown. The aforementioned first fastener, which in the example of FIG. 3 is a single screw 40, pivotably couples the tab 44 of the first segment 6 to the first end 30 of the second segment 8. Likewise, the second fastener in the example of FIG. 3 is a single screw 42, which pivotably couples tab 46 of the third segment 10 to the second end 36 of the second segment 8.

Figure 5A:
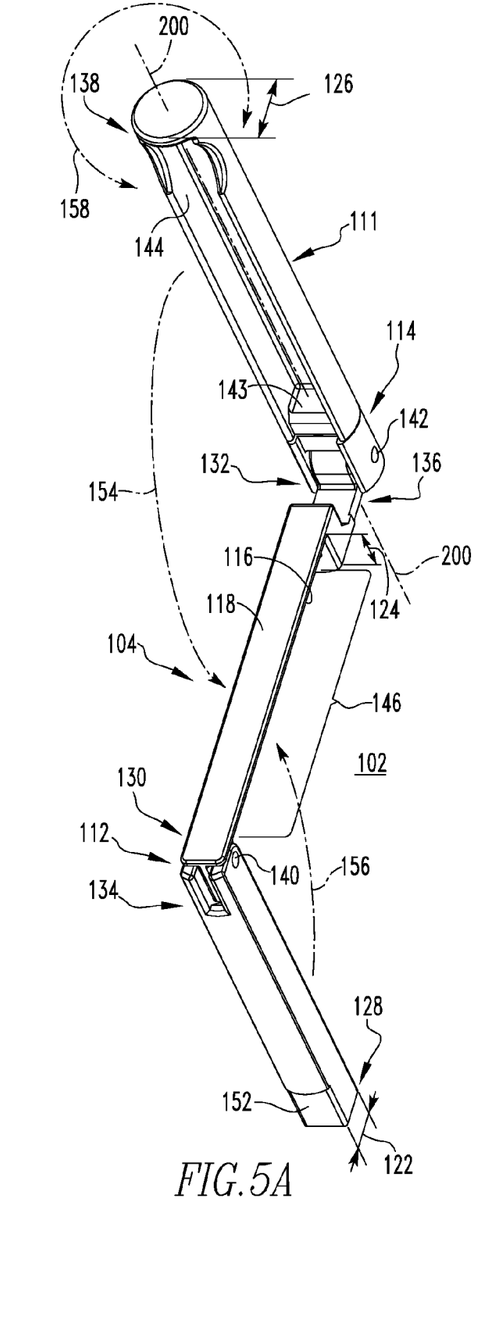
FIG. 5A is an isometric view of a tool for a draw-out circuit breaker, in accordance with another embodiment of the invention, showing the tool in a second, extended position.
Figure 5B:
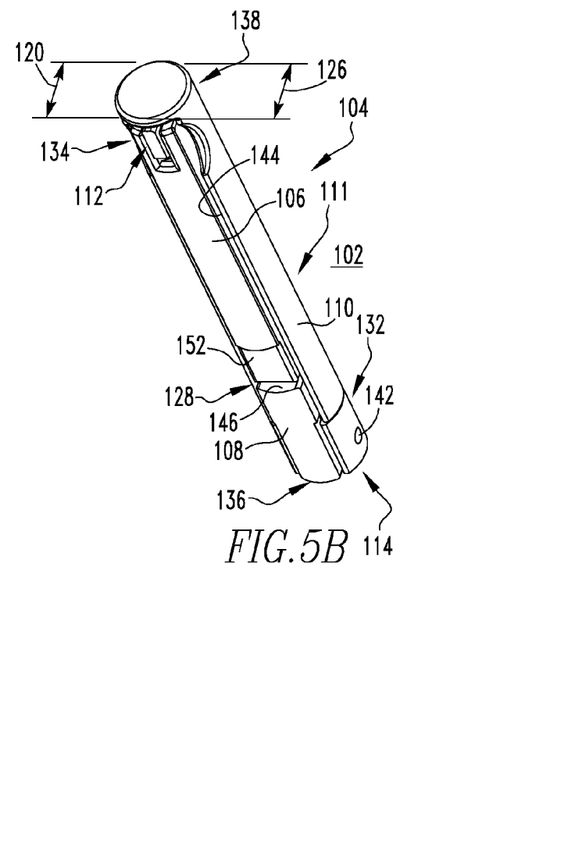
FIG. 5B is an isometric view of the tool of FIG. 5A, shown in a first, folded position.

FIGS. 5A and 5B show one non-limiting example of a tool 102 and actuating mechanism 104 therefore in accordance with another embodiment of the invention. Specifically, like the actuating mechanism 4 of tool 2, previously discussed hereinabove with respect to FIGS. 1-3, 4A and 4B, the actuating mechanism 104 of tool 102 includes first, second and third segments 106, 108 and 110, and first and second joints 112 and 114. The first end 128 of first segment 106 consists of a socket insert 152, structured to be inserted into the socket 70 (FIGS. 1 and 2) of the circuit breaker 60 (FIGS. 1 and 2). The second end 134 of the first segment 106 is pivotably coupled to the first end 130 of the second segment 108 by the first joint 112. The second end 136 of the second segment 108 is pivotably coupled to the first end 132 of the third segment 110 by the second joint 114.

An axis 200 extends perpendicularly outwardly from the second segment 108 at or about the second joint 114, as shown in FIG. 5A. The handle portion 111 of the third segment 110, which extends from at or about the second joint 114 toward the second end 138 of the third segment 110, is pivotable (e.g., clockwise and counterclockwise from the perspective of FIG. 5A, as indicated by arrow 158) about axis 200, with respect to the second segment 108 of the actuating mechanism 104. The third segment 110 of the actuating mechanism 104 includes an elongated cavity 144 into which the first and second segments 106,108 of the actuating mechanism 104 are received when the actuating mechanism 104 is disposed in the first position (FIG. 5B). More specifically, as shown in FIG. 5A, the first segment 106 has a first width 122, the second segment 108 has a second width 124, and the third segment 110 has a third width 126. When the actuating mechanism 104 is disposed in the first position, shown in FIG. 5B, the width 120 of the actuating mechanism 104 is substantially equal to the third width 126 of the third segment 110.

It will be appreciated that the first segment 106 of the actuating mechanism 104 is pivotable about the first joint 112 toward (see arrow 156 of FIG. 5A) and away from the first side 116 of the second segment 108. The third segment 110 is pivotable about second joint 114 toward (see arrow 154 of FIG. 5A) and away from the first side 116 of the second segment 108. This is similar to tool 2, previously discussed hereinabove, wherein the first segment 6 of the tool actuating mechanism 4 is folded toward and away from the first side 16 of the second segment 8, and the third segment 10 (e.g., handle portion 11) is folded toward and away from the second side 18 of the second segment 8, as shown, for example, in FIG. 3. In the example of FIGS. 5A and 5B, when the tool 102 is in the first, collapsed position of FIG. 5B, the second segment 108 is disposed within the elongated cavity 144 of the third segment 110 and is substantially overlayed by the first segment 106, which is partially exposed, as shown.

More specifically, the relatively compact (e.g., total width 120 being substantially equal to third width 126 of third segment 110) position of FIG. 5B is possible because the first segment 106 of the tool actuating mechanism 104 is receivable in a cut-out portion 146 of the second segment 108 so that the combined width of the first and second segments 106,108 is substantially equal to the second width 124 of the second segment 108. When the first segment 106 is pivoted (e.g., counterclockwise from the perspective of FIG. 5A, in the direction of arrow 156) toward the second segment 108, the cut-out portion 146 of the second segment 108 substantially receives the first segment 106. The third segment 110 is then pivoted (e.g., counterclockwise from the perspective of FIG. 5A, in the direction of arrow 154) about joint 114 toward both segments 106,108, until they are substantially disposed within the elongated cavity 144 of the third segment 110, as shown in FIG. 5B.

Accordingly, it will be appreciated that the disclosed tool 2 (FIGS. 1-3, 4A and 4B), 102 (FIGS. 5A and 5B) provides a useful mechanism for effectively manipulating the circuit breaker 60 (FIGS. 1 and 2) with respect to a housing structure 80 (FIGS. 1 and 2), which is also foldable (e.g., collapsed) into a relatively compact (e.g., small) configuration (FIGS. 2, 4B and 5B) when it is not in use, so that it may be stowed at a suitable location within the circuit breaker enclosure 64.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A tool structured to manipulate an electrical switching apparatus with respect to a housing structure, said electrical switching apparatus including a mechanical interface, said tool comprising:
 an actuating mechanism including a plurality of segments, one of said segments being structured to be coupled to said mechanical interface of said electrical switching apparatus, another one of said segments comprising a handle portion structured to be gripped by a user;
 a plurality of joints movably connecting said plurality of segments,
 wherein said actuating mechanism is movable between a first position in which said segments are disposed substantially parallel with respect to one another, and a second position in which adjacent segments of said plurality of segments are disposed substantially perpendicular with respect to each other;
 wherein said plurality of segments of said actuating mechanism is a first segment, a second segment, and a third segment; wherein said second segment is disposed between said first segment and said third segment wherein said plurality of joints is a first joint and a second joint; wherein said first joint movably couples said first segment to said second segment; and wherein said second joint movably couples said second segment to said third segment; and
 wherein said third segment comprises an elongated cavity; and wherein, when said actuating mechanism is disposed in said first position, said first segment and said second segment are substantially disposed within said elongated cavity.

2. The tool of claim 1 wherein said actuating mechanism has a width; wherein said first segment has a first width; wherein said second segment has a second width; wherein said third segment has a third width; and wherein, when said actuating mechanism is disposed in said first position, the width of said actuating mechanism is substantially equal to the third width of said third segment.

3. The tool of claim 1 wherein said second segment has a first side and a second side disposed opposite the first side of said second segment; wherein said first segment is pivotable about said first joint toward and away from the first side of said second segment; and wherein said third segment is pivotable about said second joint toward and away from the second side of said second segment.

4. The tool of claim 3 wherein said first segment includes a cut-out portion; wherein the first side of said second segment includes an elongated protrusion; and wherein, when said first segment is pivoted toward said second segment, the cut-out portion of said first segment substantially receives said second segment.

5. An electrical switching apparatus structured to be movable with respect to a housing structure, said electrical switching apparatus comprising:
 an enclosure having an exterior;
 a mechanical interface accessible from the exterior of said enclosure; and
 a tool comprising:
  an actuating mechanism including a plurality of segments, one of said segments being engageable with said mechanical interface of said electrical switching apparatus, another one of said segments comprising a handle portion structured to be gripped by a user,
  a plurality of joints movably connecting the segments of said actuating mechanism, wherein said actuating mechanism is movable between a first position in which said segments are disposed substantially parallel with respect to one another, and a second position in which adjacent segments of said plurality of segments of said actuating mechanism are disposed substantially perpendicular with respect to each other, wherein, when said actuating mechanism of said tool is disposed in said second position and said one of said segments of said actuating mechanism is engaging said mechanical interface, said tool is structured to be operable to move said electrical switching apparatus in a predetermined manner with respect to said housing structure; and wherein said enclosure includes at least one opening; wherein said at least one opening is accessible from the exterior of said enclosure; and wherein said tool is stowable within said at least one opening when said actuating mechanism of said tool is disposed in said first position.

6. An electrical switching apparatus structured to be movable with respect to a housing structure, said electrical switching apparatus comprising:

an enclosure having an exterior;
a mechanical interface accessible from the exterior of said enclosure; and
a tool comprising:
an actuating mechanism including a plurality of segments, one of said segments being engageable with said mechanical interface of said electrical switching apparatus, another one of said segments comprising a handle portion structured to be gripped by a user,
a plurality of joints movably connecting the segments of said actuating mechanism,
wherein said actuating mechanism is movable between a first position in which said segments are disposed substantially parallel with respect to one another, and a second position in which adjacent segments of said plurality of segments of said actuating mechanism are disposed substantially perpendicular with respect to each other,
wherein, when said actuating mechanism of said tool is disposed in said second position and said one of said segments of said actuating mechanism is engaging said mechanical interface, said tool is structured to be operable to move said electrical switching apparatus in a predetermined manner with respect to said housing structure;
wherein said plurality of segments of said actuating mechanism is a first segment, a second segment, and a third segment; wherein said second segment is disposed between said first segment and said third segment; wherein said plurality of joints of said actuating mechanism is a first joint and a second joint; wherein said first joint movably couples said first segment to said second segment; and wherein said second joint movably couples said second segment to said third segment; and wherein said third segment comprises an elongated cavity; wherein said actuating mechanism has a width; wherein said first segment has a first width; wherein said second segment has a second width; wherein said third segment has a third width; and wherein, when said actuating mechanism is disposed in said first position, said first segment and said second segment are substantially disposed within said elongated cavity in order that the width of said actuating mechanism is substantially equal to the third width of said third segment.

7. An electrical switching apparatus structured to be movable with respect to a housing structure, said electrical switching apparatus comprising:

an enclosure having an exterior;
a mechanical interface accessible from the exterior of said enclosure; and
a tool comprising:
an actuating mechanism including a plurality of segments, one of said segments being engageable with said mechanical interface of said electrical switching apparatus, another one of said segments comprising a handle portion structured to be gripped by a user,
a plurality of joints movably connecting the segments of said actuating mechanism,
wherein said actuating mechanism is movable between a first position in which said segments are disposed substantially parallel with respect to one another, and a second position in which adjacent segments of said plurality of segments of said actuating mechanism are disposed substantially perpendicular with respect to each other,
wherein, when said actuating mechanism of said tool is disposed in said second position and said one of said segments of said actuating mechanism is engaging said mechanical interface, said tool is structured to be operable to move said electrical switching apparatus in a predetermined manner with respect to said housing structure; and
wherein said mechanical interface of said electrical switching apparatus is a socket; wherein said socket is pivotable in a first direction corresponding to said electrical switching apparatus being structured to be drawn out of said housing structure, and in a second direction corresponding to said electrical switching apparatus being structured to be racked into said housing structure; wherein said one of said segments of said actuating mechanism of said tool is a socket insert; and wherein said socket receives said socket insert.

8. The electrical switching apparatus of claim 7 wherein, when said actuating mechanism is disposed in said second position and said socket insert is disposed within said socket, said actuating mechanism is structured to be movable in one direction to pivot said socket in said first direction and draw said electrical switching apparatus out of said housing structure, and in another direction to pivot said socket in said second direction and rack said electrical switching apparatus into said housing structure.

* * * * *